United States Patent
Yoshinaga (10) Patent No.: US 11,520,298 B2
(45) Date of Patent: Dec. 6, 2022

(54) OPERATION MONITORING TERMINAL, SAFETY INSTRUMENTED SYSTEM, AND INFORMATION DISPLAY METHOD

(71) Applicant: YOKOGAWA ELECTRIC CORPORATION, Musashino (JP)

(72) Inventor: Mayumi Yoshinaga, Musashino (JP)

(73) Assignee: YOKOGAWA ELECTRIC CORPORATION, Musashino (JP)

( * ) Notice: Subject to any disclaimer, the term of this patent is extended or adjusted under 35 U.S.C. 154(b) by 99 days.

(21) Appl. No.: 17/078,361

(22) Filed: Oct. 23, 2020

(65) Prior Publication Data

US 2021/0124313 A1 Apr. 29, 2021

(30) Foreign Application Priority Data

Oct. 24, 2019 (JP) .............................. JP2019-193812

(51) Int. Cl.
*G05B 19/042* (2006.01)
*G05B 11/01* (2006.01)
*G06F 3/14* (2006.01)

(52) U.S. Cl.
CPC ............ *G05B 11/01* (2013.01); *G05B 19/042* (2013.01); *G06F 3/1423* (2013.01)

(58) Field of Classification Search
CPC .. G05B 11/01; G05B 19/042; G05B 19/4183; G05B 19/41845; G06F 3/1423
See application file for complete search history.

(56) References Cited

U.S. PATENT DOCUMENTS

| | | | | |
|---|---|---|---|---|
| 2007/0299893 A1* | 12/2007 | Matsuyama | .......... | G06F 13/385 708/200 |
| 2009/0164030 A1* | 6/2009 | Schultze | ............. | G06F 11/3664 700/26 |
| 2012/0078386 A1* | 3/2012 | Holmes | ................ | G05B 19/042 700/17 |
| 2014/0176030 A1* | 6/2014 | Yamato | .................... | H02P 6/14 318/400.11 |

FOREIGN PATENT DOCUMENTS

JP 2006-202003 A 8/2006

* cited by examiner

*Primary Examiner* — Michael W Choi
(74) *Attorney, Agent, or Firm* — WHDA, LLP (57) ABSTRACT

An operation monitoring terminal includes a viewer that obtains from an engineering terminal, a registration file in which information including names of one or more groups that are operation monitoring targets and names of controllers that belong to the groups is set, refers to the registration file to display the groups that are the operation monitoring targets, and obtains from a controller belonging to a group selected from among the displayed groups, forcing information including a forcing target that is being subjected to forcing to determine the forcing target that is being subjected to forcing and displays a name of the controller and a name of the forcing target as information about forcing.

8 Claims, 7 Drawing Sheets

| NAME OF SCS | NAME OF VARIABLE | COMMENT ON VARIABLE | START TIME OF FORCING | DURATION OF FORCING | MODULE NAME | CHANNEL NO. |
|---|---|---|---|---|---|---|
| SCS0102 | DI 0001 | ....... | 10/15/2019 20:00:00 | 05:00:00 | 2-2 SDV144 | 1 |
| SCS0102 | DI 0002 | ....... | 10/15/2019 20:00:00 | 05:00:00 | 2-2 SDV144 | 2 |
| SCS0102 | DI 0003 | ....... | 10/15/2019 20:00:00 | 05:00:00 | 2-2 SDV144 | 3 |
| SCS0103 | DO 0001 | ....... | 10/15/2019 19:30:00 | 05:30:00 | 1-5 SDV531 | 1 |
| SCS0103 | DO 0002 | ....... | 10/15/2019 19:30:00 | 05:30:00 | 1-6 SDV531 | 1 |
| SCS0103 | DO 0003 | ....... | 10/15/2019 19:00:00 | 06:00:00 | 1-6 SDV531 | 2 |

System Alarm Message

| # | Code | Timestamp | Message |
|---|------|-----------|---------|
| 1 ◆ | 0081 | 10/14 03:20:01 | SCS0101 IOM Fail N-IO NODE 02 UNIT 01 SLOT 01 Code = 5101 |
| 2 ◇ | 0081 | 10/12 17:48:35 | SCS0101 IOM Fail N-IO NODE 03 UNIT 01 SLOT 01 Code = 5101 |
| 3 ◆ | 0081 | 10/9 22:11:49 | SCS0101 IOM Fail FIO NODE 02 SLOT 01 Code = 5101 |
| 4 ◇ | 0081 | 10/8 05:18:24 | SCS0101 IOM Fail FIO NODE 02 SLOT 03 Code = 5101 |
| 5 ◆ | 4125 | 10/4 09:35:52 | SCS0101 IOM Channel Error N-IO NODE 04 UNIT 01 SLOT 02 CH 01 IOP- (5124) |
| 6 ◇ | 4125 | 10/2 16:51:23 | SCS0101 IOM Channel Error N-IO NODE 04 UNIT 01 SLOT 02 CH 03 IOP- (5124) |
| 7 ◆ | 4125 | 9/29 11:08:45 | SCS0101 IOM Channel Error NODE 04 SLOT 02 CH 01 IOP- (5124) |
| 8 ◇ | 4125 | 9/25 08:26:07 | SCS0101 IOM Channel Error NODE 04 SLOT 02 CH 03 IOP- (5124) |
| 9 ◆ | 4101 | 9/22 20:56:35 | SCS0101 Inter-SCS Safety Communication Receive Error Variable = C0102001 Code = 5041-8000 |
| 10 ◇ | 4101 | 9/21 16:27:08 | SCS0101 Inter-SCS Safety Communication Receive Error Variable = C0102001 Code = 5041-8000 |
| 11 ◆ | 4133 | 9/18 06:52:17 | SCS0101 SCS Link Transmission Receive Error Stn(SCS)=05 Code = 5041-8000 |
| 12 ◇ | 4133 | 9/16 10:39:21 | SCS0101 SCS Link Transmission Receive Error Stn(SCS)=06 Code = 5041-8000 |

FIG. 7

OPERATION MONITORING TERMINAL, SAFETY INSTRUMENTED SYSTEM, AND INFORMATION DISPLAY METHOD

CROSS REFERENCES TO RELATED APPLICATIONS

The present application claims priority under 35 U.S.C. § 119 to Japanese Patent Application No. 2019-193812, filed Oct. 24, 2019. The contents of this application are incorporated herein by reference in their entirety.

TECHNICAL FIELD

The present disclosure relates to an operation monitoring terminal, a safety instrumented system, and an information display method.

BACKGROUND

Safety instrumented systems are designed to prevent accidents in plants and to prevent damage from spreading even in a case where an unexpected accident occurs, and are used to ensure the safety of plants. For example, in a case where an abnormality is detected during an operation, a safety instrumented system shuts down the plant.

A safety instrumented system has a forcing function. The forcing function can fix (lock) or forcibly change a channel input/output value of an input/output module or a value used in a logic of an application. The forcing function is mainly used in maintenance of field devices and debugging of applications and is set by an engineer having an engineering privilege from an engineering terminal.

Japanese Unexamined Patent Application Publication No. 2006-202003 discloses a system in which, at an engineering terminal, a variable can be locked or unlocked so as to prevent or allow taking-in of the variable and an engineer can select any input/output module and perform a lock operation or an unlock operation.

However, with the safety instrumented system according to the related art, an operator having no engineering privilege is not allowed to use the engineering terminal and is unable to easily check information about forcing.

SUMMARY

The present disclosure has been made in view of the above-described issue, and provides, for example, an operation monitoring terminal, a safety instrumented system, and an information display method that allow an operator having no engineering privilege to easily check information about forcing.

An operation monitoring terminal according to some embodiments is an operation monitoring terminal connected to, via a network, one or more controllers and an engineering terminal that engineers the controllers. The operation monitoring terminal includes a viewer that obtains from the engineering terminal, a registration file in which information including identification information (for example, names) of one or more groups that are operation monitoring targets and identification information (for example, names) of the controllers that belong to the groups is set, refers to the registration file to display the groups that are the operation monitoring targets, and obtains from a controller belonging to a group selected from among the displayed groups, forcing information including a forcing target that is being subjected to forcing to determine the forcing target that is being subjected to forcing and displays identification information (for example, a name) of the controller and identification information (for example, a name) of the forcing target as information about forcing.

With this configuration, an operator having no engineering privilege can easily check the latest forcing state at a plurality of operation monitoring terminals.

In one embodiment, the viewer may display as the information about forcing, a start time and a duration of the forcing and determine whether the duration of the forcing exceeds a preset duration.

With this configuration, an operator can check the start time and already elapsed duration of the forcing simply with certainty without analyzing event information and can also check whether the forcing state continues for the specified duration or more.

In one embodiment, in a case where the forcing is locking of a variable, the viewer may display a locked value and an actual value of the variable.

With this configuration, an operator can check the present (actual) values and determine whether unlocking can be performed without any problem.

In one embodiment, the operation monitoring terminal may further include an operation monitoring unit that displays information to be monitored in a safety instrumented system, the viewer may communicate the information about forcing to the operation monitoring unit, and the operation monitoring unit may perform display regarding the forcing target that is being subjected to forcing in a manner to be distinguishable from other display.

With this configuration, an operator can check the forcing state also on an operation monitoring screen, and the efficiency of operations can be further increased.

In one embodiment, the engineering terminal may generate a conversion table that includes correspondences between identification information of forcing targets and identification information of objects that use the forcing targets, the viewer may obtain on the basis of the conversion table and communicate to the operation monitoring unit, identification information of an object that uses the determined forcing target, and the operation monitoring unit may perform display regarding the object using the forcing target that is being subjected to forcing in a manner to be distinguishable from other display.

With this configuration, even in a case where display regarding the object using the forcing target is performed on the operation monitoring screen, an operator can check the forcing state on the operation monitoring screen.

A safety instrumented system according to some embodiments includes: the operation monitoring terminal; the engineering terminal; and the one or more controllers.

With this configuration, an operator having no engineering privilege can easily check the latest forcing state at a plurality of operation monitoring terminals.

An information display method according to some embodiments is an information display method for displaying information about forcing in a safety instrumented system including one or more controllers, an engineering terminal that engineers the controllers, and at least one operation monitoring terminal that are connected to a network. The information display method includes: a step of setting and saving in a registration file, information including identification information (for example, names) of one or more groups that are operation monitoring targets of the operation monitoring terminal and identification information (for example, names) of the controllers that belong to the groups, by the engineering terminal; a step of referring to the registration file to display the groups that are the operation monitoring targets, by the operation monitoring terminal; and a step of obtaining from a controller belonging to a group selected from among the displayed groups, forcing information including a forcing target that is being subjected to forcing to determine the forcing target that is being subjected to forcing and displaying identification information of the controller and identification information of the forcing target as information about forcing, by the operation monitoring terminal.

With this operation, an operator having no engineering privilege can easily check the latest forcing state at a plurality of operation monitoring terminals.

According to the present disclosure, for example, an operator can easily check information about forcing.

DESCRIPTION OF THE PREFERRED EMBODIMENTS

Hereinafter, embodiments of the present disclosure will be described with reference to the drawings. In the description, "engineering terminal" is referred to as "SENG" (safety engineering personal computer (PC)) and "controller" is referred to as "SCS" (safety control station).

Figure 1:
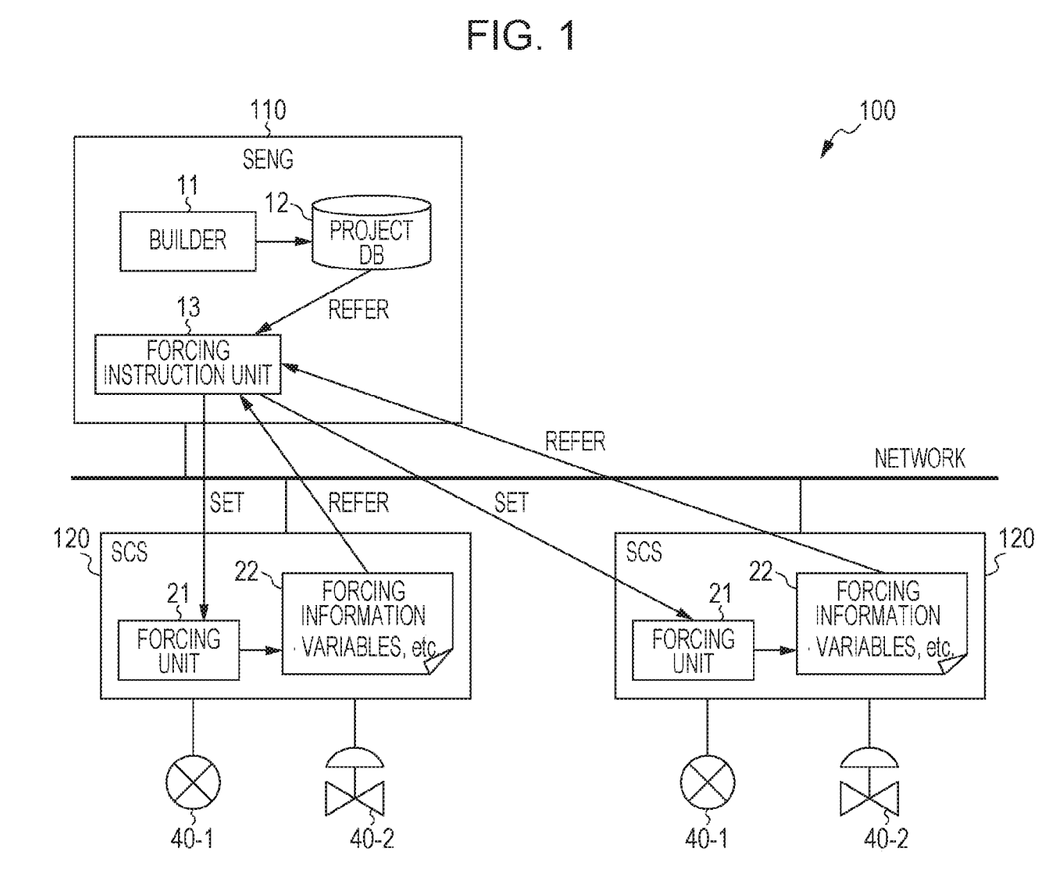
FIG. 1 is a diagram illustrating a configuration of a safety instrumented system according to a comparative example.

First, a safety instrumented system according to a comparative example is described. FIG. 1 is a diagram illustrating a configuration of a safety instrumented system (SIS) 100 according to the comparative example. The safety instrumented system 100 includes an SENG 110 and one or more SCSs 120, which are connected to a network.

A field device 40 is a device connected to each SCS 120. In FIG. 1, as the field device 40, a sensor 40-1, which is, for example, a pressure gauge, a flowmeter, or a temperature sensor, for data input from a plant and an actuator 40-2, which is, for example, a control valve, a pump, or a valve, for data output to the plant are illustrated.

The SENG 110 is an engineering terminal and includes a builder 11, a project database (DB) 12, a forcing instruction unit 13, and a display. Note that the project DB 12 may be included in a terminal different from the SENG 110.

The builder 11 engineers the safety instrumented system 100 and saves the results of engineering in the project DB 12 as engineering data. The builder 11 downloads the engineering data to the SCSs 120.

The forcing instruction unit 13 gives the SCSs 120 an instruction for performing forcing on a forcing target. Examples of the forcing target include a variable (an input/output variable or an internal variable), SCS link transmission, inter-SCS safety communication, subsystem communication, and safety subsystem communication.

The SCS 120 is a controller and has a function of data input from the field device 40-1, which is, for example, a sensor, and data output to the field device 40-2, which is, for example, an actuator, and a function of performing forcing on input/output values of these field devices. The SCS 120 includes a forcing unit 21.

In accordance with an instruction from the forcing instruction unit 13, the forcing unit 21 performs forcing, such as locking (fixing) of a forcing target (which is, for example, a variable) or changing of the value of a variable that is a forcing target, or cancels forcing. The forcing unit 21 generates and saves in a storage unit not illustrated, forcing information 22 that indicates the forcing state of the forcing target.

For example, in a case where a variable is locked, the forcing instruction unit 13 selects a variable to be subjected to forcing and gives an instruction to the SCS 120. Then, the forcing unit 21 of the SCS 120 locks the variable in accordance with the instruction. The forcing unit 21 saves the lock/unlock state of the variable as the forcing information 22.

For example, in a case where the lock state of a forcing target is displayed, the forcing instruction unit 13 obtains information indicating the name of the forcing target and the position of the forcing target from the project DB 12 and displays the information on the display. The forcing instruction unit 13 obtains the forcing information 22 from the SCS 120 concerned and performs display on the display such that whether the forcing target is in the lock state is known.

In the safety instrumented system 100 thus configured, at the time of, for example, maintenance of a plant, an operator needs to pay attention to the following points regarding forcing. The operator is a person who monitors the safety instrumented system to check any abnormality.

First, the operator needs to determine the forcing state. In order to perform operation monitoring that is suitable to the maintenance state of the plant, the operator needs to determine a forcing target that is subjected to forcing. For example, in a case where a system alarm is raised and the system alarm is an alarm regarding a forcing target that is being subjected to forcing, the operator knows the cause of the alarm, and therefore, need not hurriedly take an action. On the other hand, in a case where a system alarm regarding a forcing target that is not being subjected forcing is raised, the operator needs to correctly take an action. Accordingly, the operator needs to determine the severity of a system alarm in accordance with the forcing state.

Second, in terms of safety, it is not desirable to keep a forcing target subjected to forcing for a long time at the time of maintenance, and therefore, the operator needs to determine whether forcing is cancelled within a time limit, that is, needs to determine the start time and duration of the forcing.

Third, the operator needs to focus on an operation monitoring target of the operator and to perform operations in order to prevent an incorrect operation.

However, the safety instrumented system 100 has problems for the above-described points.

Regarding the first point, namely, determination of the forcing state, there is a problem as follows. After an engineer has set forcing from the SENG 110, the operator needs to monitor the forcing state on a per SCS 120 basis. Forcing information can be set and displayed from only the SENG 110. The SENG 110 is for engineering the safety instrumented system 100 and the engineer is given a privilege, but the operator is not allowed to operate the SENG 110. Therefore, the engineer needs to manually record forcing information as electronic data or on paper and deliver the forcing information to the operator. Further, one SCS 120 can be engineered by only one SENG 110, and therefore, it is not possible for multiple persons to check forcing information at the same time. Multiple operators perform operation monitoring of the safety instrumented system 100 using multiple operation monitoring terminals, and therefore, it is desirable to allow the operators to check forcing information at multiple locations similarly.

Regarding the second point, namely, determination of, for example, the duration of forcing, there is a problem as follows. The forcing instruction unit 13 of the SENG 110 does not have a function of displaying the start time of forcing, and therefore, it is not possible for the forcing instruction unit 13 to check the duration of forcing. The start time of forcing can be checked by using an event occurrence time that is communicated at the time when the forcing is set. For this, in addition to standard functions, a mechanism of extracting only an event related to forcing from among a large number of pieces of event information and analyzing the event needs to be provided.

Regarding the third point, namely, prevention of an incorrect operation, there is a problem as follows. The operator needs to focus on a forcing target of the SCS 120 that is an operation monitoring target of the operator and to perform operations; however, it is not possible to display only the forcing state of the forcing target. Therefore, the operator is unable to quickly check necessary information. In the related art, a forcing target that is not subjected to forcing is also displayed at the same time, and therefore, information important to the operator is buried, and there is the possibility that the operator overlooks the forcing state of the forcing target.

Accordingly, in the present disclosure, an operation monitoring terminal, a safety instrumented system, and an information display method that achieve the followings will be described. First, the operator can check the latest forcing state at multiple terminals. Second, the operator can check the start time and duration of forcing simply with certainty without analyzing event information. Third, only the forcing state of a monitoring target of the operator can be displayed.

First Embodiment

Figure 2:
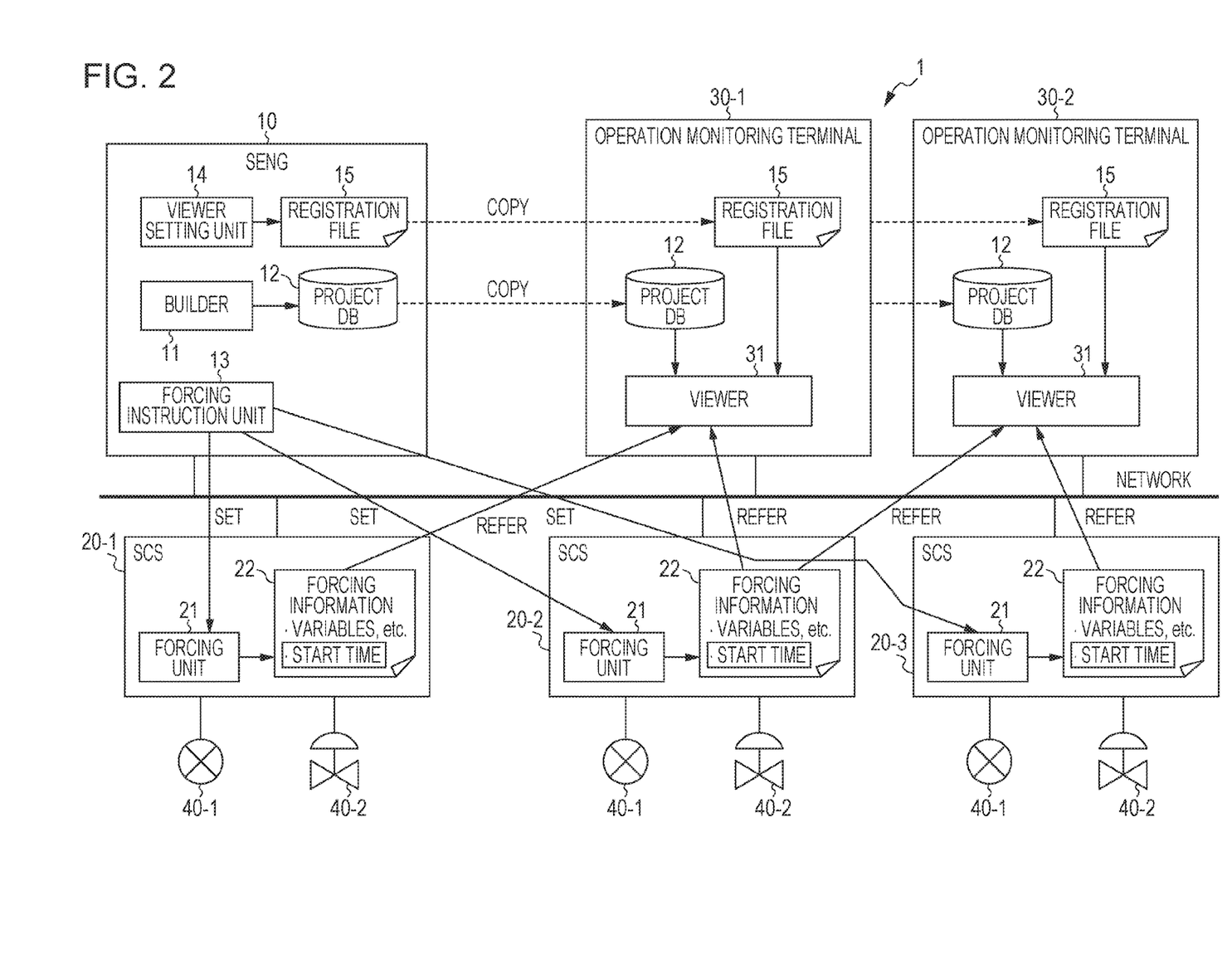
FIG. 2 is a block diagram illustrating an example configuration of a safety instrumented system according to a first embodiment.

FIG. 2 is a block diagram illustrating an example configuration of a safety instrumented system 1 according to a first embodiment. As illustrated in FIG. 2, the safety instrumented system 1 includes an SENG 10, one or more SCS 20, and one or more operation monitoring terminals 30, which are connected to a network. To each SCS 20, the field device 40 is connected. The SENG 10, the SCS 20, and the operation monitoring terminals 30 as well as IO module 26 may be implemented by a device, such as a computer, which comprises a processor, such as a central processing unit (CPU), and a memory device, such ROM and RAM.

The operation monitoring terminal 30 is a terminal for operation monitoring of the safety instrumented system 1, and an operator and an engineer have an operation privilege. The operation monitoring terminal 30 includes a viewer 31.

The viewer 31 has a function of collecting information about forcing, generating a display screen, and displaying the display screen on a display. The engineer and the operator are allowed to use the viewer 31.

The SENG 10 is an engineering terminal for which only the engineer has an operation privilege. The SENG 10 includes the builder 11, the project DB 12, the forcing instruction unit 13, a viewer setting unit 14, and a registration file 15. Note that the project DB 12 may be included in a PC different from the SENG 10.

The builder 11 engineers the SCSs 20 and saves the results of engineering in the project DB 12 as engineering data. The builder 11 downloads the engineering data to the SCSs 20. The project DB 12 saves, for example, the names of the SCSs 20, the names of forcing targets (for example, the names of variables), comments on the forcing targets, and information (for example, a module name and a channel number) indicating a physical position via which each forcing target is input and output in the SCS 20 concerned.

The forcing instruction unit 13 gives the SCSs 20 an instruction for performing forcing on a forcing target.

The viewer setting unit 14 sets, in accordance with an operation by the engineer, information necessary for display setting of the viewer 31 and collection of forcing information and saves the information in the registration file 15. Only the engineer is allowed to operate the viewer setting unit 14.

The registration file 15 is a file in which setting information set by the viewer setting unit 14 is saved. Specifically, in the registration file 15, information that is set by the engineer and that includes, for example, the names of the operation monitoring terminals 30 in which the viewer 31 operates, the names of one or more groups that are operation monitoring targets of each operation monitoring terminal 30, and the names of SCSs 20 that belong to each group is saved. An example of the information saved in the registration file 15 is illustrated in Table 1. In the registration file 15, the upper limit of the forcing period of a forcing target may be saved. The upper limit of the forcing period can be set for each forcing target, on a per SCS 20 basis, or on a per system basis. The engineer copies the registration file 15 and the project DB 12 to the operation monitoring terminals 30 in which the viewer 31 operates. In the registration file 15, a plurality of SCSs 20 that are targets of operation monitoring by the operator are registered as a group, and the viewer 31 displays information about forcing on a per group basis.

TABLE 1

| Name of operation monitoring terminal in which viewer operates | Group name |
| --- | --- |
| Operation monitoring terminal 30-1 | Group A |
| Operation monitoring terminal 30-2 | Group B, Group C |

| Group name | Name of SCS belonging to group |
| --- | --- |
| Group A | SCS 20-1, SCS 20-2 |
| Group B | SCS 20-2 |
| Group C | SCS 20-3 |

The SCS 20 is a controller. The SCS 20 includes the forcing unit 21.

The forcing unit 21 performs forcing and cancels forcing, and generates and saves in a storage unit not illustrated, the forcing information 22 that includes information indicating forcing targets that are being subjected to forcing and the start times of forcing.

The viewer 31 of the operation monitoring terminal 30 refers to the registration file 15 copied from the SENG 10 to determine the SCSs 20 belonging to one or more groups that are monitoring targets. For example, in a case where the names of the operation monitoring terminals 30 in which the viewer 31 operates and the names of groups are set as in Table 1 shown above, the operation monitoring targets of the operation monitoring terminal 30-1 are the SCS 20-1 and the SCS 20-2 belonging to group A. The operation monitoring targets of the operation monitoring terminal 30-2 are the SCS 20-2 belonging to group B and the SCS 20-3 belonging to group C. For convenience of description, the number of SCSs 20 is three here; however, the number of SCSs 20 is actually very large. Therefore, it is effective to use the registration file 15 to manage the SCSs 20 that are operation monitoring targets.

Next, the viewer 31 refers to the forcing information 22 generated by the forcing unit 21 of the SCSs 20 belonging to a group that is a monitoring target and that is selected by the operator to determine forcing targets that are being subjected to forcing. Further, the viewer 31 refers to the registration file 15 copied from the SENG 10 to obtain the names of the SCSs 20 that belong to the group selected by the operator, and refers to the project DB 12 copied from the SENG 10 to obtain information including, for example, the names of the forcing targets subjected to forcing, comments on the forcing targets, the start times of forcing, the module names, and the channel names and displays these pieces of information as information about forcing.

Figure 3:
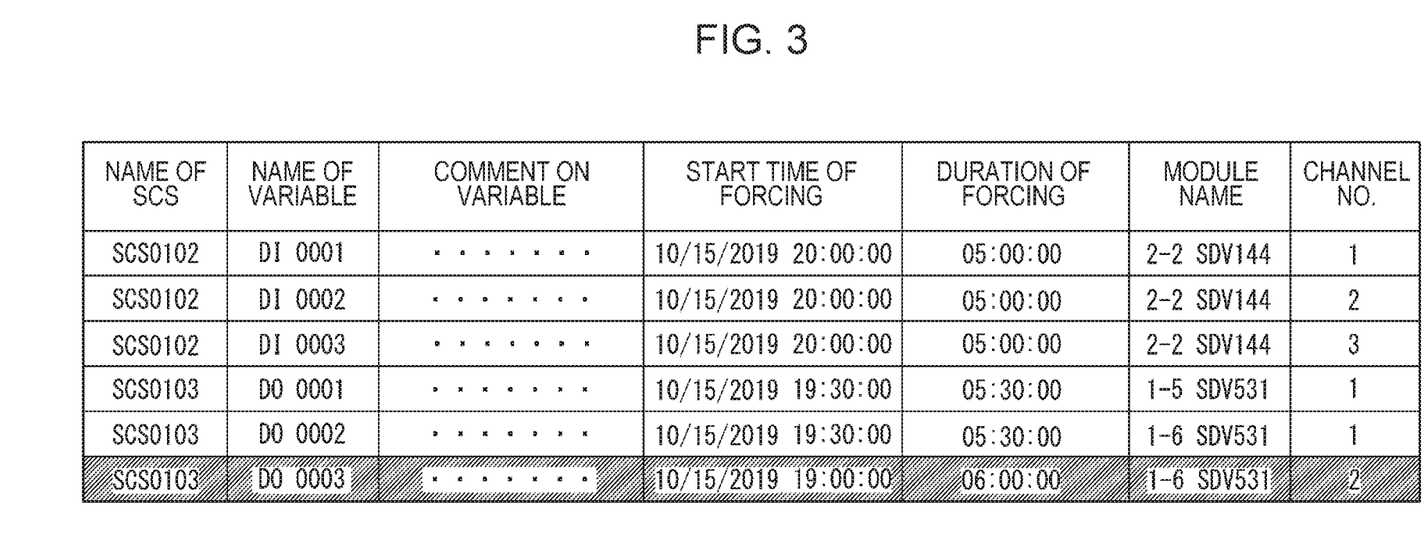
FIG. 3 is a diagram illustrating an example display screen of the safety instrumented system according to the first embodiment.

FIG. 3 illustrates an example display screen generated by the viewer 31. This information list can be collectively saved in, for example, a CSV file or printed. As illustrated in FIG. 3, the viewer 31 may display information about the durations of forcing. The viewer 31 determines whether a duration of forcing exceeds a preset duration. In a case where a duration of forcing exceeds the preset duration, the viewer 31 may perform, for example, highlighted display in a distinguishable manner such that the duration of forcing exceeding the preset duration is easily noticed. In the example display illustrated in FIG. 3, the duration for the variable at the bottom is six hours, and the display is highlighted.

In a case where forcing is locking of a variable, the viewer 31 may generate and display a display screen including the locked value (logical value) and the actual value (physical value) of the variable. When these values are displayed, the operator can check the present (actual) values and determine whether unlocking can be performed without any problem. Some or all out of the builder 11, the forcing instruction unit 13, the viewer setting unit 14, the forcing unit 21 and the viewer 31 are implemented by the processor executing a program (software). Moreover, of these, some or all may be implemented by hardware such as a large scale integration (LSI) or an application specific integrated circuit (ASIC), or may be implemented by a combination of software and hardware.

Information Display Method

Figure 4:
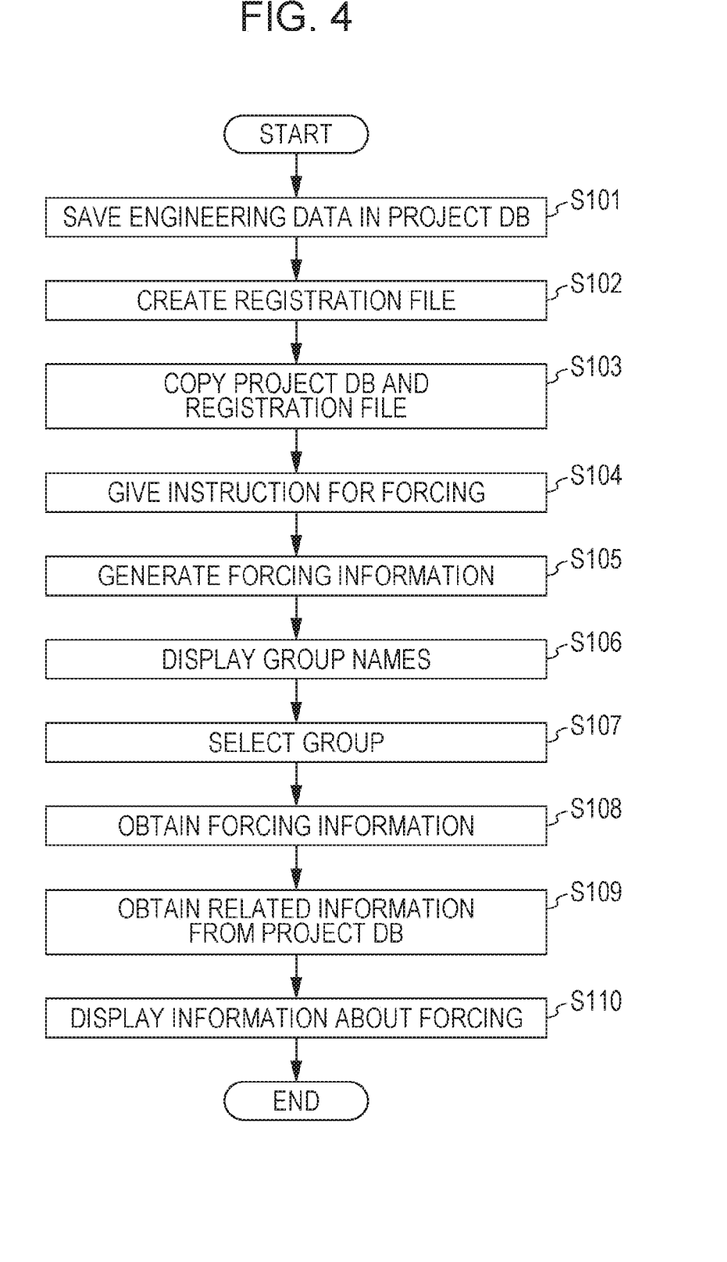
FIG. 4 is a flowchart illustrating an example method for displaying information about forcing in the safety instrumented system according to the first embodiment.

Next, the information display method for displaying information about forcing is described with reference to FIG. 4.

In step S101, the engineer uses the builder 11 of the SENG 10 to engineer the safety instrumented system 1, and the builder 11 saves engineering data in the project DB 12.

In step S102, the viewer setting unit 14 of the SENG 10 creates the registration file 15 in which information including, for example, the names of groups to be monitored by each operation monitoring terminal 30 and the names of the SCSs 20 that belong to each group is saved.

In step S103, the engineer copies a necessary file in the project DB 12 and the registration file 15 to the operation monitoring terminals 30 in which the viewer 31 operates.

In step S104, the forcing instruction unit 13 of the SENG 10 gives an instruction for performing forcing. For example, at the time of locking or unlocking of a variable, the forcing instruction unit 13 selects a variable to be locked or unlocked and gives an instruction to the SCS 20.

In step S105, the forcing unit 21 of the SCS 20 locks or unlocks the variable specified by the forcing instruction unit 13 and generates the forcing information 22 that includes forcing targets that are being subjected to forcing.

In step S106, the viewer 31 of the operation monitoring terminal 30 obtains registration information about groups from the copied registration file 15 and displays a list of the obtained group names on the display.

In step S107, the operator selects from the list of the group names displayed in step S106, a group for which forcing information is to be displayed.

In step S108, the viewer 31 obtains the forcing information 22 from the SCSs 20 that belong to the group selected in step S107.

In step S109, the viewer 31 obtains from the copied project DB 12, information regarding the forcing targets (for example, the names of forcing targets) included in the obtained forcing information 22.

In step S110, the viewer 31 assembles the obtained information, and generates and displays on the display, information about forcing.

As described above, the operation monitoring terminal 30 according to the first embodiment includes the viewer 31 that refers to the registration file 15, displays groups that are monitoring targets, obtains from the SCSs 20 that belong to a group selected from among the displayed groups, the forcing information 22 including forcing targets that are being subjected to forcing, determines the forcing targets that are being subjected to forcing, and displays the names of the SCSs 20 and the names of the forcing targets as information about forcing. With this configuration, an operator who has no engineering privilege and is not allowed to use the SENG 10 can easily check the latest forcing state at the plurality of operation monitoring terminals 30. Therefore, risk factors including mistakes occurring in, for example, communication or operations can be reduced while operations including handing over of work between an engineer and an operator or between operators are made efficient. The viewer 31 can display information about forcing related to the SCS 20 that is a monitoring target of an operator without omission, and the same information about forcing can be displayed also on a different operation monitoring terminal 30 without any individual setting. Further, the viewer 31 can display only information about forcing that is a monitoring target so as to prevent information not necessary for the operator from being displayed.

The viewer 31 displays the start time and duration of forcing as information about forcing, and therefore, the information can be checked simply with certainty without an analysis of event information. Further, the viewer 31 determines whether a duration of forcing exceeds a preset duration, and therefore, the forcing state that continues for the specified duration or more can be indicated.

Second Embodiment

Figure 5:
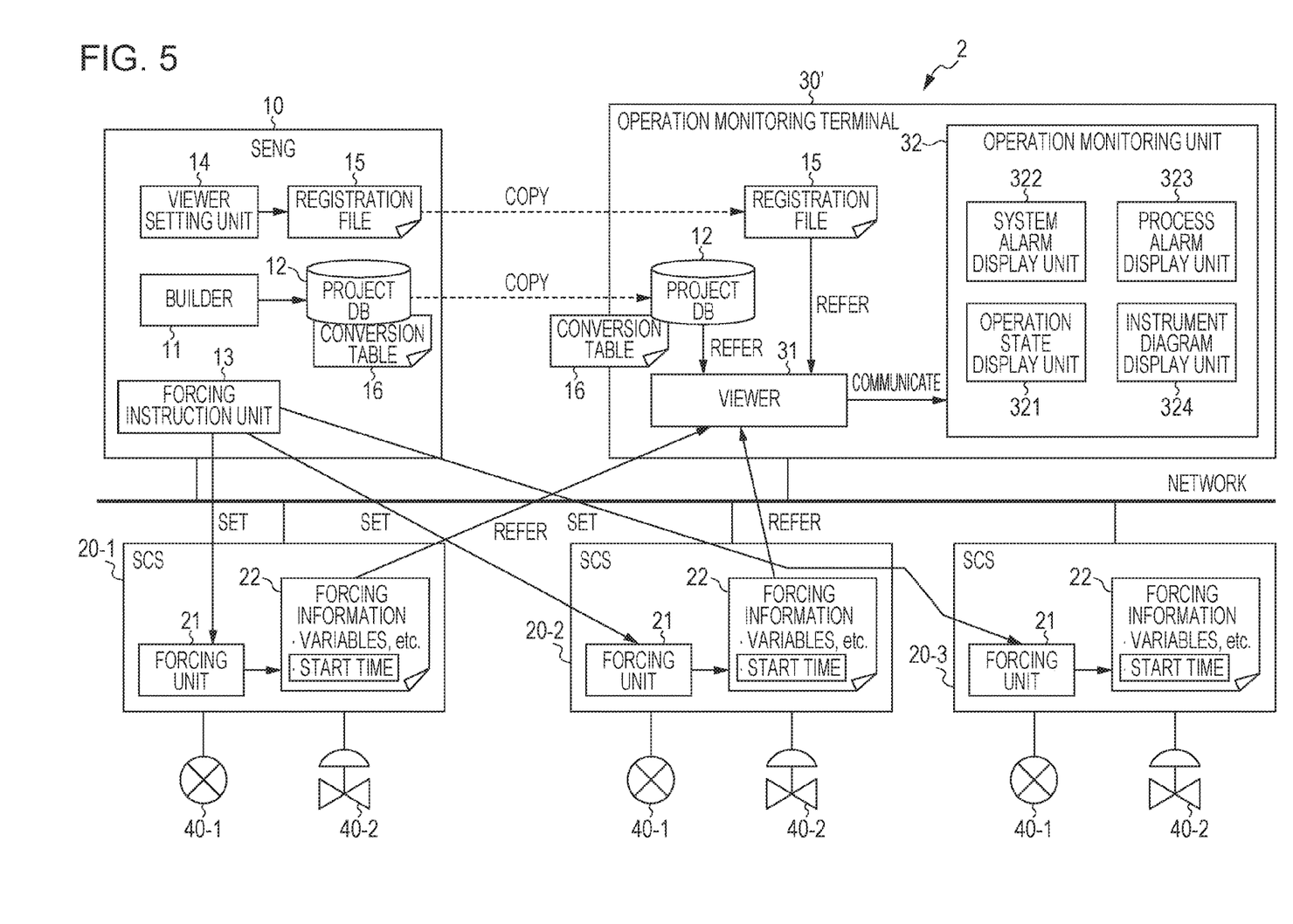
FIG. 5 is a block diagram illustrating an example configuration of a safety instrumented system according to a second embodiment.

Next, a safety instrumented system 2 according to a second embodiment is described. FIG. 5 is a block diagram illustrating an example configuration of the safety instrumented system 2 according to the second embodiment. As illustrated in FIG. 5, the safety instrumented system 2 includes the SENG 10, one or more SCSs 20, and at least one operation monitoring terminal 30', which are connected to a network. To each SCS 20, the field device 40 is connected.

A display application for operation monitoring usually used by the operator is an application independent of the viewer 31, and therefore, in the first embodiment, a display screen (operation monitoring screen) for operation monitoring usually used by the operator and a screen displayed by the viewer 31 are separate screens. In this embodiment, information about forcing is displayed on the operation monitoring screen to thereby further increase the efficiency of operations. Differences from the first embodiment are described below.

On the operation monitoring screen displayed by the operation monitoring terminal 30', not only the names of forcing targets but also objects (for example, control blocks or tags that instantiate the control blocks) using the forcing targets and the names of the objects are displayed, for example, in a list form or by graphics.

At the time of engineering of the safety instrumented system 2, the builder 11 generates and saves in the project DB 12 a conversion table 16 that includes correspondences between the names of forcing targets and the names of objects that use the forcing targets. The conversion table 16 can be used to convert the name of a forcing target to the name of an object.

The operation monitoring terminal 30' includes the viewer 31 and an operation monitoring unit 32 that displays information to be monitored in the safety instrumented system 2. The operation monitoring unit 32 includes an operation state display unit 321, a system alarm display unit 322, a process alarm display unit 323, and an instrument diagram display unit 324.

The viewer 31 refers to the forcing information 22 of the SCSs 20, the registration file 15 copied from the SENG 10, and the project DB 12 copied from the SENG 10. The viewer 31 obtains forcing targets that are being subjected to forcing from the forcing information 22 of the SCSs 20 and obtains the names of objects that use the forcing targets on the basis of the conversion table 16. The viewer 31 communicates information about forcing and object information indicating the names of the objects that use the forcing targets to the operation monitoring unit 32.

The operation state display unit 321 and the system alarm display unit 322 receive the information about forcing from the viewer 31 and perform display regarding the forcing targets that are being subjected to forcing so as to be distinguishable from other display.

The process alarm display unit 323 and the instrument diagram display unit 324 receive the information about forcing and the object information from the viewer 31 and perform display regarding the objects using the forcing targets that are being subjected to forcing so as to be distinguishable from other display.

The operation state display unit 321 displays the states of devices that constitute the safety instrumented system 2 and displays, for example, whether the state of the hardware and communication bus of the SCSs 20 is normal. For example, in a case where an input/output (IO) variable of the SCS 20 is locked, the operation state display unit 321 can change the display method, namely, for example, change the color of display of the state of the hardware and communication bus to thereby notify the operator of the lock state.

The system alarm display unit 322 displays an alarm message reporting an abnormality or restoration of the hardware or communication of the safety instrumented system 2. For example, in a case of an alarm regarding a locked forcing target, the system alarm display unit 322 can change the display method, namely, for example, change the color of display of the alarm or add (or change) a mark, to thereby notify the operator of the lock state.

Figure 6:
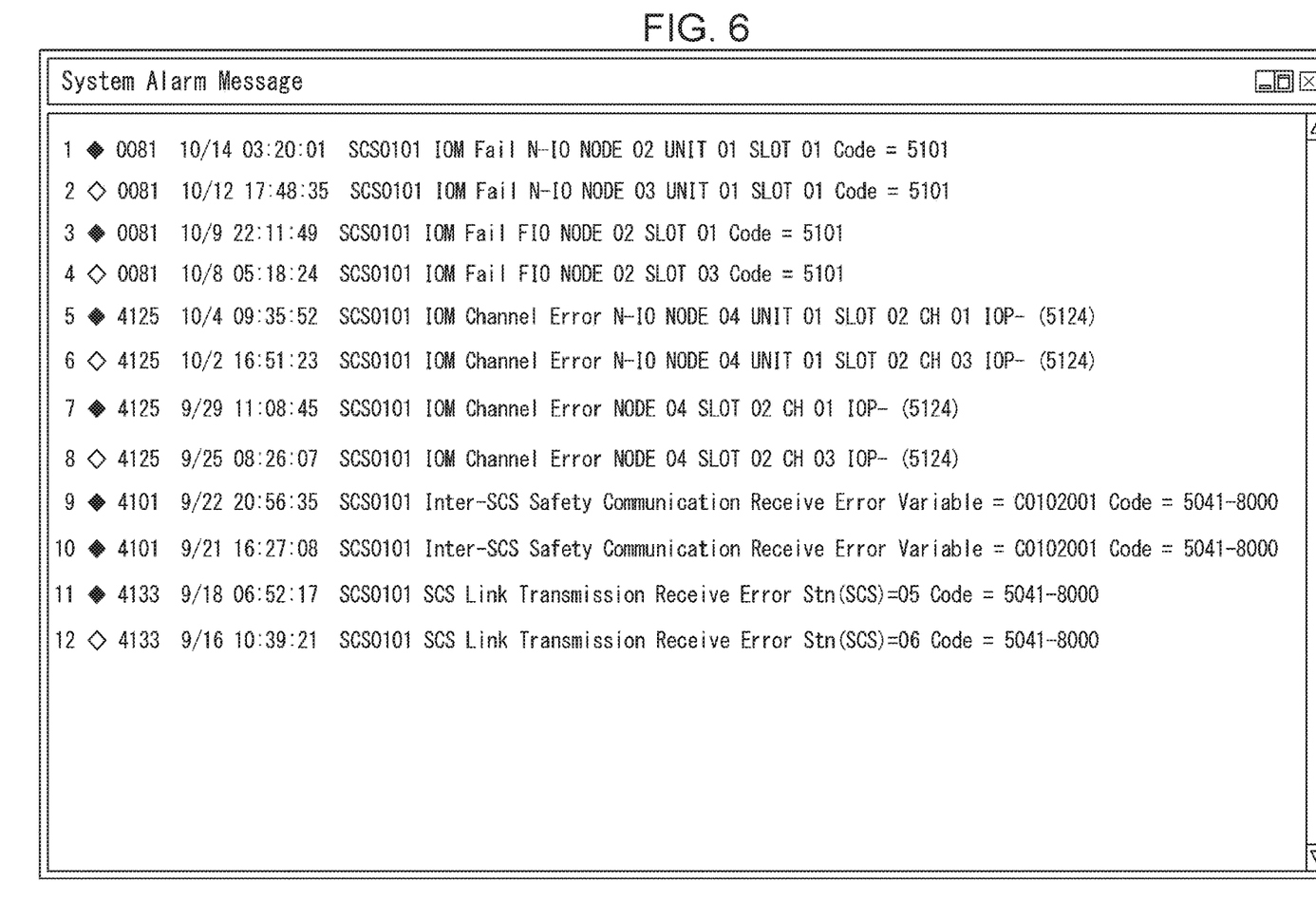
FIG. 6 is a diagram illustrating an example display screen of the safety instrumented system according to the second embodiment.

FIG. 6 is a diagram illustrating an example screen displayed by the system alarm display unit 322 on a display. In each row, a mark indicating whether locking is ongoing, a message number, the date and time of the occurrence of the alarm, the name of the SCS 20, and the details of the alarm are indicated, and pieces of information are listed in chronological order from the bottom to the top. The leftmost rhombus mark is a mark indicating whether locking is ongoing. The white rhombus mark indicates that locking is ongoing, and the black rhombus mark indicates that locking is not ongoing.

The process alarm display unit 323 and the instrument diagram display unit 324 do not display forcing targets but display information about objects that use the forcing targets. The objects are indirectly affected by forcing performed on the forcing targets, and the operator mainly monitors the object names, and therefore, it is desirable that whether forcing is ongoing can be determined from display of the object names.

The process alarm display unit 323 displays an alarm message reporting an abnormality or restoration regarding a process. For example, in a case of an alarm regarding an object that uses a locked forcing target, the process alarm display unit 323 can change the display method, namely, for example, change the color of display of the alarm or display a mark, to thereby notify the operator of the lock state.

The instrument diagram display unit 324 graphically displays an instrument diagram including objects, the state of, for example, contact input, and the value of process data. For example, for a diagram of an instrument that uses a locked forcing target, the instrument diagram display unit 324 can change the display method, namely, for example, change the color, display a comment, or display a mark, to thereby notify the operator of the lock state.

As described above, the viewer 31 of the operation monitoring terminal 30' according to this embodiment communicates information about forcing to the operation monitoring unit 32, and the operation monitoring unit 32 performs display regarding a forcing target that is being subjected to forcing so as to be distinguishable from other display. With this configuration, the forcing state can be checked also on the operation monitoring screen, and the efficiency of operations can be further increased. Further, the viewer 31 communicates to the operation monitoring unit 32 only information about the SCS 20 that is a monitoring target to thereby reduce the load of communication processing.

The builder 11 generates the conversion table 16 that includes correspondences between the names of forcing targets and the names of objects that use the forcing targets. The viewer 31 obtains on the basis of the conversion table 16 and communicates to the operation monitoring unit 32, the names of the objects that use the forcing targets. The operation monitoring unit 32 performs display regarding the objects using the forcing targets that are being subjected to forcing so as to be distinguishable from other display. With this configuration, even in a case where display regarding the objects that use the forcing targets is performed on the operation monitoring screen, the forcing state can also be checked on the operation monitoring screen.

Third Embodiment

Figure 7:
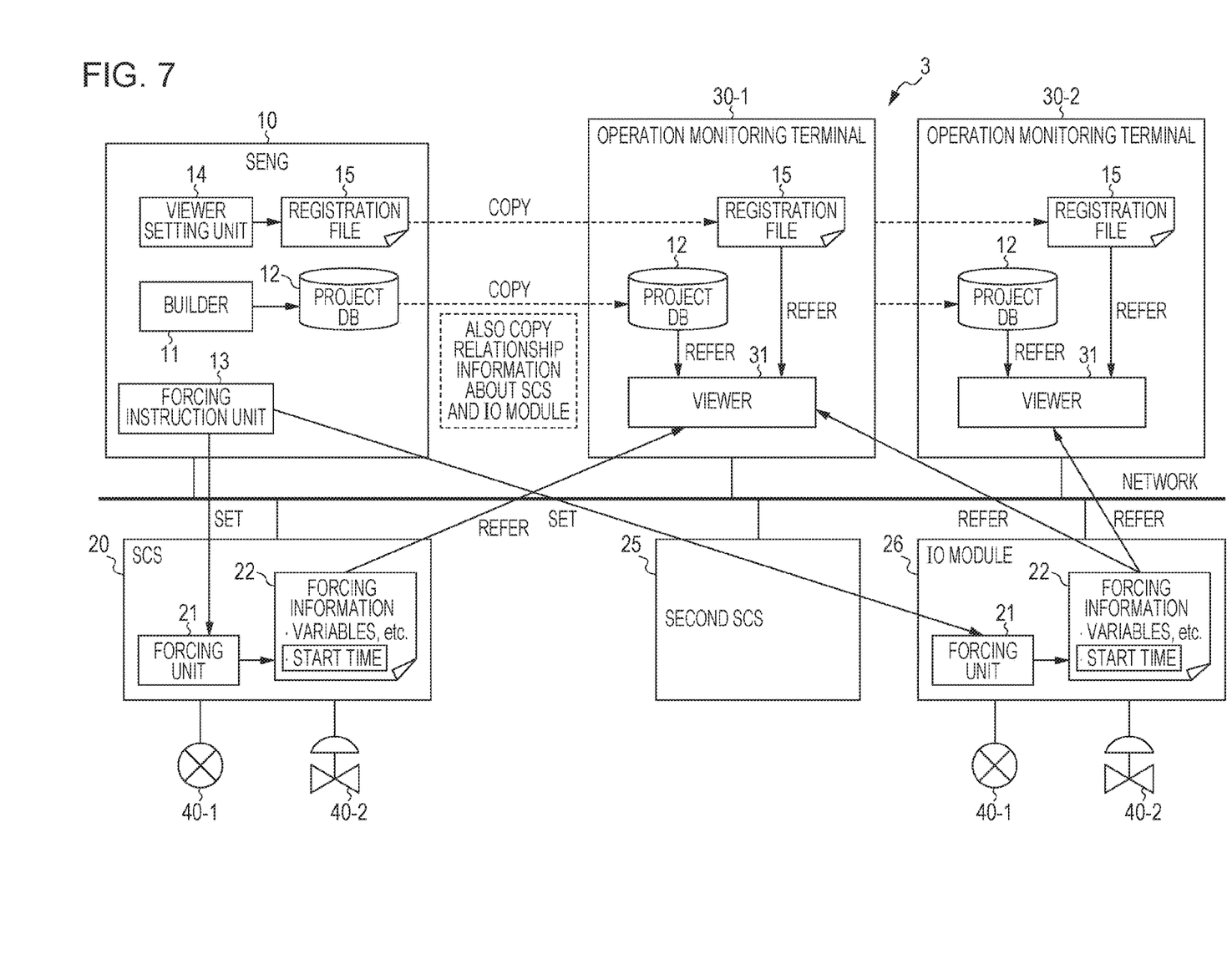
FIG. 7 is a block diagram illustrating an example configuration of a safety instrumented system according to a third embodiment.

Next, a safety instrumented system 3 according to a third embodiment is described. FIG. 7 is a block diagram illustrating an example configuration of the safety instrumented system 3 according to the third embodiment. As illustrated in FIG. 7, the safety instrumented system 3 includes the SENG 10, at least one SCS 20, at least one second SCS 25, at least one IO module 26, and one or more operation monitoring terminals 30, which are connected to a network. To each SCS 20 and each IO module 26, the field device 40 is connected.

In the configurations of the first embodiment and the second embodiment, the viewer 31 can refer to a forcing target that corresponds to an input value from the field device 40-1 or an output value to the field device 40-2 from only one SCS 20 that is connected to the field device 40. In this embodiment, the IO module of the SCS 20 is separated from the SCS 20, and thus, the SCS 20 is divided into the second SCS 25 and the IO module 26 to thereby enable referring of a forcing target from a plurality of SCSs. Therefore, the forcing unit 21 and the forcing information 22 are not included in the second SCS 25 but included in the IO module 26. As illustrated in FIG. 7, the safety instrumented system 3 may include the SCS 20 from which the IO module is not separated.

The viewer 31 obtains the forcing information 22 from the SCS 20 and from the IO module 26. As described above, the viewer 31 only displays information about forcing related to the SCS that is a monitoring target, and therefore, needs to determine whether a forcing target obtained from the 10 module 26 is related to the SCS that is a monitoring target. Therefore, the project DB 12 includes relationship information indicating a correspondence between the second SCS 25 and the 10 module 26, and the operation monitoring terminal 30 copies the project DB 12 from the SENG 10 to thereby obtain the relationship information. Accordingly, the viewer 31 can determine on the basis of the relationship information, whether the forcing information 22 obtained from the 10 module 26 is the forcing information 22 of the SCS that is a monitoring target and can perform display.

Although the embodiments have been described above as representative examples, it should be understood that a person skilled in the art can easily make various modifications or revisions on the basis of the present disclosure. Therefore, it should be noted that these modifications or revisions are included in the scope of the present disclosure. For example, a plurality of configuration blocks or steps can be combined to form one configuration block or one step, or one configuration block or one step may be divided. Although a specific form of embodiment has been described above and illustrated in the accompanying drawings in order to be more clearly understood, the above description is made by way of example and not as limiting the scope of the invention defined by the accompanying claims.

What is claimed is:

1. An operation monitoring terminal connected to, via a network, one or more controllers and an engineering terminal that engineers the controllers, the operation monitoring terminal comprising:
a viewer that
obtains from the engineering terminal, a registration file comprising information including identification information of one or more groups that are operation monitoring targets, and identification information of the controllers that belong to the groups,
refers to the registration file to display the groups that are the operation monitoring targets, and
obtains from a first controller belonging to a group selected among the displayed groups, forcing information including a forcing target that is being subjected to forcing to determine the forcing target that is being subjected to the forcing, and
displays identification information of the first controller and identification information of the forcing target as information about forcing,
wherein the forcing is locking of a variable, and the viewer displays a locked value of the variable and an actual value of the variable.

2. The operation monitoring terminal according to claim 1, wherein
the viewer displays as the information about forcing, a start time and a duration of the forcing, and determines whether the duration of the forcing exceeds a preset duration.

3. The operation monitoring terminal according to claim 1, further comprising
an operation monitoring unit that displays information to be monitored in a safety instrumented system, wherein
the viewer communicates the information about forcing to the operation monitoring unit, and
the operation monitoring unit performs display regarding the forcing target that is being subjected to forcing in a manner to be distinguishable from other display.

4. The operation monitoring terminal according to claim 3, wherein
the engineering terminal generates a conversion table that includes correspondences between the identification information of the forcing targets and identification information of objects that use the forcing targets,
the viewer obtains on the basis of the conversion table and communicates to the operation monitoring unit, information about an object that uses the determined forcing target, and
the operation monitoring unit performs display regarding the object using the forcing target that is being subjected to forcing in a manner to be distinguishable from other display.

5. A safety instrumented system comprising:
the operation monitoring terminal according claim 1;
the engineering terminal according to claim 1; and
the one or more controllers according to claim 1.

6. The operation monitoring terminal according to claim 1, wherein the forcing is a function to fix or forcibly change (i) an input value of the one or more controllers, (ii) an output value of the one or more controllers, or (iii) an variable used in an application program in the one or more controllers.

7. An information display method of displaying information about forcing in a safety instrumented system including one or more controllers, an engineering terminal that engineers the controllers, and at least one operation monitoring terminal that are connected to a network, the information display method comprising:
a step of setting and saving in a registration file, information including identification information of one or more groups that are operation monitoring targets of the at least one operation monitoring terminal and identification information of the controllers that belong to the groups, by the engineering terminal;

a step of referring to the registration file to display the groups that are the operation monitoring targets, by the at least one operation monitoring terminal; and a step of obtaining from a first controller belonging to a group selected among the displayed groups, forcing information including a forcing target that is being subjected to forcing to determine the forcing target that is being subjected to the forcing, and displaying identification information of the first controller and identification information of the forcing target as information about the forcing, by the at least one operation monitoring terminal, wherein the method further comprises:

a step of generating a conversion table that includes correspondences between the identification information of the forcing targets and identification information of objects that use the forcing targets, by the engineering terminal;

a step of obtaining on the basis of the conversion table information about an object that uses the determined forcing target, by the at least one operation monitoring terminal, and a step of displaying regarding the object using the forcing target that is being subjected to the forcing in a manner to be distinguishable from other display, by the at least one operation monitoring terminal.

8. An operation monitoring terminal connected to, via a network, one or more controllers and an engineering terminal that engineers the controllers, the operation monitoring terminal comprising:

a viewer that obtains from the engineering terminal, a registration file comprising information including identification information of one or more groups that are operation monitoring targets and identification information of the controllers that belong to the groups, refers to the registration file to display the groups that are the operation monitoring targets, and obtains from a first controller belonging to a group selected among the displayed groups, forcing information including a forcing target that is being subjected to forcing to determine the forcing target that is being subjected to the forcing, and displays identification information of the first controller and identification information of the forcing target as information about forcing; and an operation monitoring unit that displays information to be monitored in a safety instrumented system, wherein the viewer communicates the information about forcing to the operation monitoring unit, the operation monitoring unit performs display regarding the forcing target that is being subjected to forcing in a manner to be distinguishable from other display, the engineering terminal generates a conversion table that includes correspondences between the identification information of the forcing targets and identification information of objects that use the forcing targets, the viewer obtains on the basis of the conversion table and communicates to the operation monitoring unit, information about an object that uses the determined forcing target, and the operation monitoring unit performs display regarding the object using the forcing target that is being subjected to forcing in a manner to be distinguishable from other display.

\* \* \* \* \*